July 14, 1931.　　　　　M. WEISET　　　　1,814,102
HIGH TENSION ELECTRIC CABLE WITH PAPER INSULATION
Filed April 15, 1929
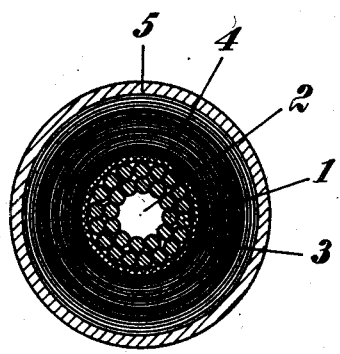
Inventor:
Max Weiset
By Pennie Davis Marvin + Edmonds
attorneys Patented July 14, 1931

1,814,102

UNITED STATES PATENT OFFICE

MAX WEISET, OF TEMPELHOF, NEAR BERLIN, GERMANY

HIGH TENSION ELECTRIC CABLE WITH PAPER INSULATION

Application filed April 15, 1929, Serial No. 355,010, and in Germany June 16, 1928.

The means for insulating high tension cables consists, as known, generally of paper which is wound around the conductor in strip form and then impregnated with liquid insulating substances such as oils, resins or mixtures of such substances.

High-value insulating oils show a proportionately high expansion due to heat; a property which makes itself disturbingly evident with high tension cables in operation. The expansion amounts to 0.1% for each degree, centigrade, of temperature increase, so that even with the heating up of a cable from 10° to 35°, for example, the total expansion in volume amounts to 2.5%. As the impregnating substance, on the cooling down again of the cable naturally contracts about the same amount, hollow spaces readily form in the insulation unless arrangements are provided which effect a feeding of the mass in the paper layers out of a kind of store-space.

In order to provide such store-spaces it has been proposed to form the conductor hollow internally. This hollow space is filled with substance during the impregnation of the cable. When the cable cools, the outermost layers under the lead casing first take up a lower temperature; the liquid substance in them thickens, contracts, and as a result, sucks the still thin fluid substance, which is near the interior, slowly out of the conductor.

The insulating layers directly upon the conductor which have a particularly high dielectric stress are also maintained well impregnated, if the interior of the conductor contains sufficent impregnating substance, as the latter presses outwardly from the conductor in a radial direction to the surface thereof and thence out into the paper layers.

The purpose of the hollow space in the conductor is naturally then only achieved, if the conductor is permeable by the impregnating substance in a radial direction; that is, the individual wires forming the conductor must have sufficient play upon each other, they must not form a tight closure. This entails that the surface of the conductor cannot be completely smooth, but must show crevices.

Now, however, a conductor surface which is as smooth as possible is deliberately sought in high tension cables, as with such conductors the dielectric stress in the insulating layers lying directly on the conductor is much more favourable. On this ground it has been preferred, to press a thin lead casing around the conductor, or to enclose it in a metallized paper with the metal-coated side of the paper against the conductor.

All these means have the disadvantage that, while they reduce the dielectric stress, they, at the same time, hinder the very important feeding out of the impregnating substance from the interior of conductor, as they seal the outer surface of the conductor. The employment of hollow conductors which ensure a good impregnation of the insulation of a cable while it is in operation, and the arrangement of a conducting layer for rendering smooth the outer surface of the conductor are therefore, when carried out as hitherto known, mutually exclusive and opposed in their effect.

The present invention unites these advantages without any disadvantages having to be put up with. With this object in view, a conducting layer is arranged on the hollow chambered conductor, which layer consists of a material of porous and absorptive capacity so that the layer is permeable by the impregnating substance. This layer consists advantageously of a paper which during manufacture in the pulp has already received an addition of a finely divided conducting material as for example, dispersed metal powder, graphite, and the like. Experiments have proved that it is possible to load the paper pulp with sufficient of such material to render the papers manufactured therefrom electrically conducting without noticeably affecting the absorptive capacity for, and permeability to, the impregnating insulating material. The pulp can be so porous and employed in such thickness that it takes up a sufficient amount of the impregnating fluid to supply the volumetric difference between the warm and the cold fluid. In this case special hollow spaces in the conductor may be dispensed with, and the conductor itself can consist of a stranded member enclosed in a lead casing, or of a single solid wire. Further, fine mesh woven metal or even textile fabric whose threads consist in part of fine metal threads or ribbons are suitable for the permeable conducting layer according to the invention.

The drawing shows a constructional form of the invention. 1 is the conductor, which comprises a number of individual wires or strands twisted together which can surround a central hollow chamber 2. In this hollow space, supporting members such as helical springs or the like can be arranged in a manner known per se. The conductor 1 has one or more layers of an electrical conducting band 3 wrapped upon it, which are permeable by the impregnating substance. On this layer follows the normal paper wrapping 4 applied as is usual in high tension cable practice. The insulated main is encased in a lead casing 5.

Having now particularly described and ascertained the nature of my said invention, and in what manner the same is to be performed, I declare that what I claim is:—

1. A high tension cable comprising a conductor, an impregnated paper insulation and an electrical conducting layer on the conductor, said layer lying immediately on the conductor and consisting of a porous electrical conducting material so that said layer is permeable by the impregnating substance and by the electrical current.

2. A high tension cable comprising a conductor, an impregnated paper insulation and electrical conducting layer on the conductor, said layer lying between the conductor and the insulation and consisting of paper containing a finely divided conducting material.

3. A high tension cable comprising a conductor, an impregnated paper insulation and an electrical conducting layer on the conductor, said layer lying between the conductor and the insulation and consisting of paper which during manufacture has received in the pulp an addition of conducting material in a fine state of division.

4. A high tension cable comprising a conductor, an impregnated paper insulation and an electrical conducting layer on the conductor, said layer lying between the conductor and the insulation and consisting of paper which contains graphite.

5. A high tension cable comprising a conductor, an impregnated paper insulation and an electrical conducting layer on the conductor, said layer lying between the conductor and the insulation and consisting of paper which contains graphite, embedded in a finely divided state within the fibres.

6. A high tension cable comprising a conductor, an impregnated paper insulation and an electrical conducting layer on the conductor, said layer lying between the conductor and the insulation and consisting of porous paper which contains a finely dispersed electrical conducting material, the said paper insulation containing an impregnating fluid, the conductor having a surface impermeable by the said fluid, and the absorptive conducting layer having such a thickness, that it takes up a sufficient amount of the impregnating fluid to supply the volumetric difference between the warm and cold fluid.

7. A high tension cable comprising a conductor, an impregnated paper insulation and an electrical conducting layer on the conductor, said layer lying between the conductor and the insulation and consisting of a porous or absorptive material, which is conductive for the electrical current across its section that is in radial direction, the said paper insulation containing an impregnating fluid, the conductor consisting of a single solid wire and the absorptive conducting layer having such a thickness that it takes up a sufficient amount of the impregnating fluid to supply the volumetric difference between the warm and cold fluid.

In testimony whereof I have hereunto set my hand.

MAX WEISET.